United States Patent [19]

Kimbro

[11] 4,188,049

[45] Feb. 12, 1980

[54] ADJUSTABLE STABILIZER FOR MOTOR VEHICLES AND THE LIKE

[76] Inventor: Robert M. Kimbro, 7752 Garvey Ave., Rosemead, Calif. 91776

[21] Appl. No.: 908,809

[22] Filed: May 24, 1978

[51] Int. Cl.² ............................................. B60S 9/02
[52] U.S. Cl. .................................. 280/766; 248/410; 403/109
[58] Field of Search .............. 280/766, 765; 248/410, 248/412; 403/109, 110; 188/67

[56] References Cited

U.S. PATENT DOCUMENTS

| | | | |
|---|---|---|---|
| 590,774 | 9/1897 | Rexroth | 248/410 |
| 3,334,931 | 8/1967 | Holt et al. | 248/410 |
| 3,625,542 | 12/1971 | Curtis | 280/766 |
| 3,737,136 | 6/1973 | Snurr | 248/412 |

Primary Examiner—Robert R. Song
Attorney, Agent, or Firm—Fred N. Schwend

[57] ABSTRACT

The stabilizer includes telescoping members, one comprising a bracket attachable to a vehicle body and the other comprising an extendable ground engaging post. Two oppositely operating one-way ball clutches are selectively controlled to lock the post in stabilizing position or in retracted position, and a third one-way ball clutch which cooperates with the post and one of the first two ball clutches is operated by a hand actuated rocking lever to raise the vehicle body for levelling or like purposes.

9 Claims, 7 Drawing Figures

U.S. Patent
Feb. 12, 1980
4,188,049
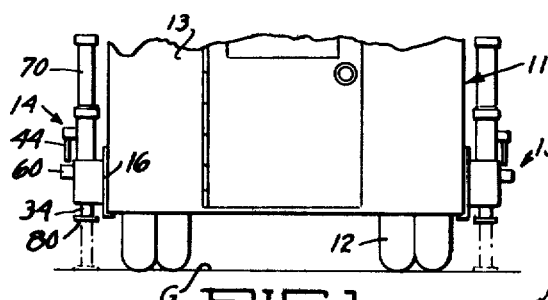
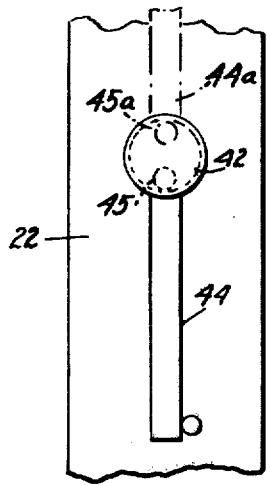
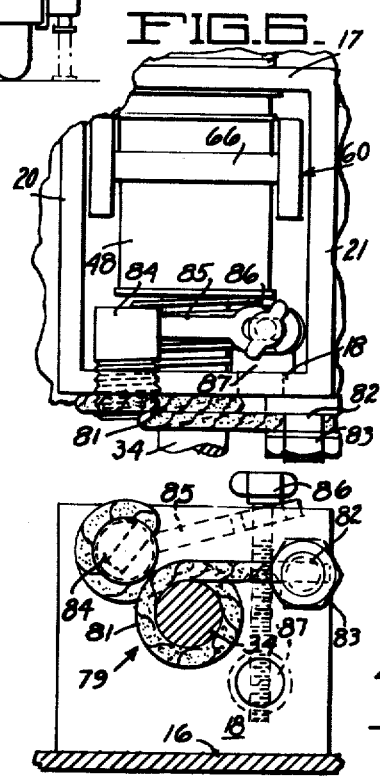
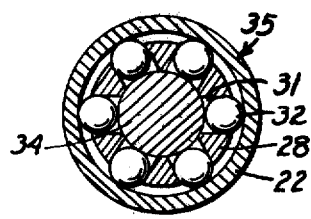
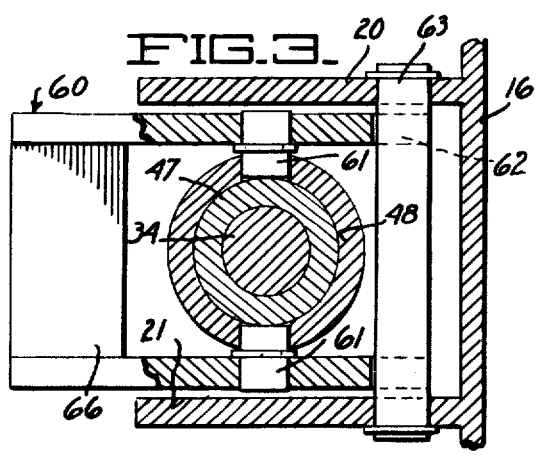
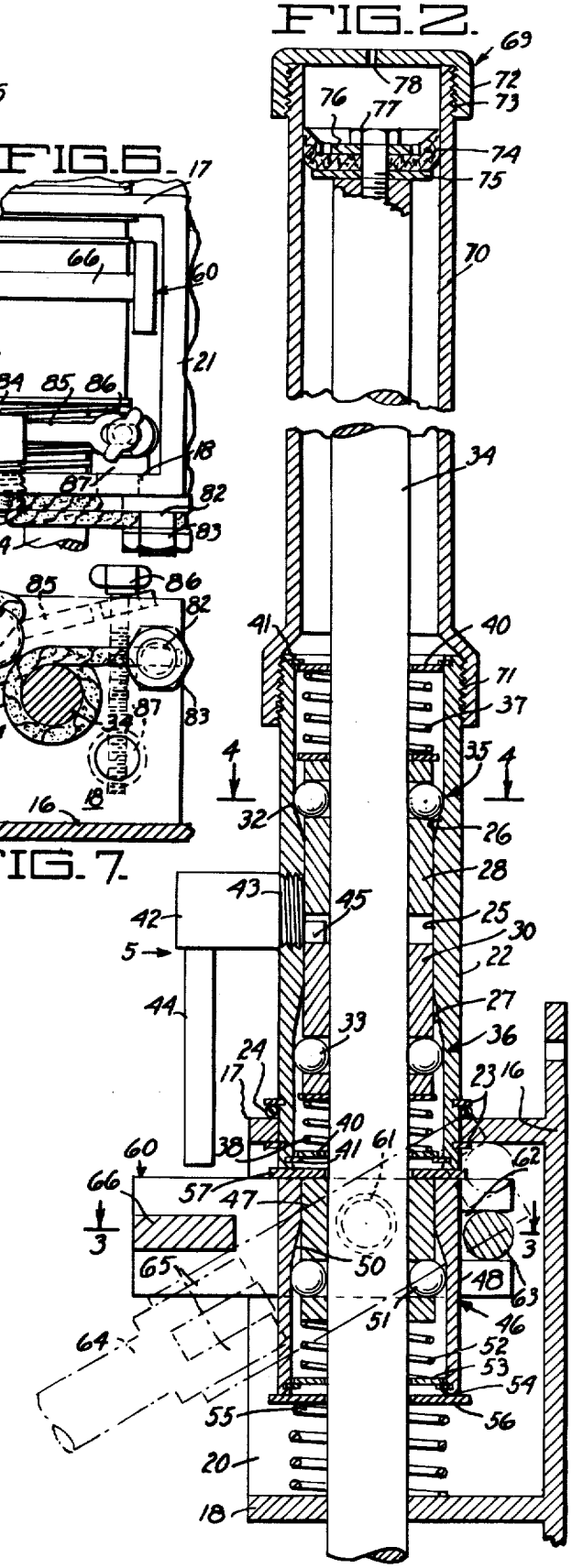

ADJUSTABLE STABILIZER FOR MOTOR VEHICLES AND THE LIKE

BACKGROUND OF THE INVENTION

1. Field of the Invention

This invention relates to adjustable supports in general and has particular reference to adjustable stabilizers for bracing the bodies of motor vehicles, such as recreational vehicles, against rocking when the vehicle is parked.

2. Description of the Prior Art

As is well known, motor vehicle bodies are normally supported by road wheels through springs to absorb road shocks. However, when a vehicle, particularly a trailer, camper, motor home or the like, is parked, it is desirable to brace the body against swaying or rocking, as may be occasioned by wind or by a person walking over the floor of the vehicle. Heretofore, this has generally been accomplished by providing adjustable jacks which are placed in appropriate locations under the vehicle body and then raised to body supporting positions. Although such jacks are generally satisfactory, they are a nuisance to handle and adjust since they must be removed from storage, properly placed under the vehicle body and then adjusted to the proper height. Such is inconvenient, tedious and time consuming.

Attempts have been made heretofore to overcome the above problem by providing adjustable stabilizers which are pivotally and permanently mounted below the vehicle body. When the body is to be stabilized against rocking, the stabilizers are swung into bracing position and then adjusted to the proper height to engage the ground. When not in use, the stabilizers are swung out of the way. The U.S. Pat., No 2. 2,162,181 issued to P. A. Skinner and 3,879,055 to M. N. Sill et al are examples of such devices. However, such stabilizers require that the operator reach under the vehicle to release each stabilizer from its retracted position and no jacking or other means are provided for enabling the stabilizers to raise the vehicle body as may be desired for leveling purposes. Also, the pivotal connection of each stabilizer forms a weak point in the construction since a large part of the weight of the vehicle body may have to be supported by the stabilizers.

SUMMARY OF THE INVENTION

A principal object of the present invention is to provide an adjustable parking stabilizer for a motor vehicle body or the like which may be easily and quickly set in proper stabilizing condition or retracted.

Another object is to provide an adjustable parking stabilizer of the above type which obviates a need for a pivotal support for moving the stabilizer into and out of stabilizing condition.

A further object is to provide an adjustable stabilizer for leveling a vehicle body.

Another object is to provide a parking stabilizer of the above type which may be easily manipulated without having to crawl or reach under the vehicle body.

According to the present invention, an adjustable stabilizer is provided for a motor vehicle body comprising telescoping devices, one attached to the vehicle body and the other forming a ground surface engaging post. A pair of one-way clutches are provided, one normally enabling movement of the post in one direction only and the other normally enabling movement of the post in the opposite direction only. Control means are provided for selectively releasing one or the other clutch whereby the post may be automatically locked in either a stabilizing position or in a retracted position. A third one-way clutch, which may be clutched to the post, is manually operable in cooperation with one of such other clutches to raise the vehicle body for leveling or the like.

BRIEF DESCRIPTION OF THE DRAWINGS

The manner in which the above and other objects of the invention are accomplished will be readily understood on reference to the following specification when read in conjunction with the accompanying drawing, wherein:

FIG. 1 is a rear view of a motor vehicle, partly broken away, and with adjustable stabilizers attached to the body thereof embodying a preferred form of the present invention.

FIG. 2 is a sectional elevational view through one of the adjustable stabilizers.

FIG. 3 is a sectional plan view taken along the line 3—3 of FIG. 2.

FIG. 4 is a sectional plan view through one of the one-way ball clutches and is taken along the line 4—4 of FIG. 2.

FIG. 5 is a fragmentary front view taken in the direction of the arrow 5 of FIG. 2, illustrating the clutch selector.

FIG. 6 is a front view, with parts broken away, of a modified form of the invention.

FIG. 7 is a bottom plan view of the form shown in FIG. 6.

DESCRIPTION OF THE PREFERRED EMBODIMENT

While this invention is susceptible of embodiment in many different forms, there is shown in the drawings and will be described in detail, one specific embodiment, with the understanding that the present disclosure is to be considered as an exemplification of the principles of the invention and is not intended to limit the invention to the embodiment illustrated. The scope of the invention will be pointed out in the appended claims.

Referring to the drawing and to FIG. 1 in particular, there is shown a motor vehicle 11, such as a camper having road wheels 12 and a body 13 supported by the wheels through the usual spring suspension system, not shown, whereby to absorb road shocks and the like. Adjustable stabilizers generally indicated at 14 and 15 are mounted on the body and are shown in retracted positions. Preferably, four such stabilizers are provided, one for each corner of the vehicle body for stabilizing the body against rocking or swaying when the vehicle is parked.

Referring to FIGS. 2 to 6, each stabilizer, i.e. 14, comprises a bracket 16 which may be suitably secured to the side of the vehicle body by screws or the like, not shown. The bracket 16 includes two vertically spaced horizontal shelves 17 and 18 joined by side walls 20 and 21.

A tubular bearing member 22 is fitted within an opening in the upper shelf 17 and is retained in place by spaced split rings 23 fitted in grooves in the member 22, an O-ring 24 of elastomeric material being interposed between the upper ring 23 and the shelf 17 to prevent leakage of water into the portion of the stabilizer located below the shelf 17.

The inner bore 25 of the bearing member 22 joins two spaced oppositely tapered conical bore sections 26 and 27. A pair of ball cages 28 and 30 are independently slideably mounted in the bore 25 and have radially extending holes 31 (FIG. 4) therein to receive sets of balls 32 and 33, respectively. Such balls are engageable between the tapered bore sections 26 and 27, respectively, and a post 34 of hardened steel which is slideable endwise through the bearing cages 28 and 30, thereby forming two one-way clutches generally indicated at 35 and 36.

Springs 37 and 38 are compressed between the opposite ends of the cages 28, 30 and annular spring retainer discs 40 held in place at opposite ends of the bearing member 22 by split retainer rings 41 fitted in grooves in the bearing member. The springs 37 and 38 tend to move the respective cages 28 and 30 endwise to wedge the balls 32, 33 between the post 34 and the respective conical bore sections 26, 27 to lock the post against endwise movement in either direction relative to the bracket 16.

Means are provided to selectively release either of the clutches 35 and 36. For this purpose, a control member 42 is screw threaded at 43 within the wall of the bearing member 22 and comprises a handle 44 for rotating the member and an eccentric camming pin 45 which extends between the adjacent ends of the ball cages 28 and 30.

When the control member 42 is in its full line position shown in FIGS. 2 and 5, the pin 45 allows the spring 37 to force the cage 28 downwardly to wedge the balls 32 between the post 34 and the conical bore section 26 thus enabling the clutch 35 to engage to lock the post against the downward movement relative to the bracket 16 although permitting upward movement of the post. At the same time, the pin 45 forces the ball cage 30 downwardly to release the balls 33 from engagement with the associated conical bore section 27, thereby releasing the clutch 36.

When the handle 44 is swung 180° into its alternate position shown by the dot-dash lines 44a of FIG. 5, the camming pin 45 moves upwardly to its alternate position 45a to release the ball cage 30 to the action of its spring 38, thus wedging the balls 33 between the post and the conical bore section 27 to lock the post against upward movement relative to the bracket 16 while allowing relative downward movement of the post, that is, engaging the clutch 36 and disengaging the clutch 35.

A third one-way clutch generally indicated at 46 is provided to raise the bracket 16, and therefore the attached portion of the vehicle body, along the post 34 as may be desired to level the body. The clutch 46 comprises a tubular ball cage 47 slideable over post 34 and, in turn, slideably supporting a second tubular member or slider 48 having a conical bore section 50 similar to bore section 27. Balls 51 are carried in radially extending holes in the cage 47 and are located between the post 34 and the bore of the bearing member 48. A spring 52 is compressed between the cage 47 and an annular spring retainer disc 53 held in place at the lower end of the bearing member 48 by a spring clip 54 mounted in a groove in the member 48. A spring 55, which is stronger than the spring 52, is compressed between the lower bracket shelf 18 and a floating annular disc 56 resting against the bottom of the bearing member 48 to normally hold both the bearing member 48 and the ball cage 47 against a second annular floating disc 57 which rests against the bottom of the bearing member 22.

In this addition of the parts, the balls 51 are held below the conical bore section 50 and thus the clutch 46 is normally in relaxed condition to permit free longitudinal movement of the post 34 in either direction.

A U-shaped jack lever 60 (see also FIG. 3) is provided whose legs straddle the bearing member 48 and are pivoted to coaxially extending trunnions 61 which are also pivotally mounted in bearings formed in the bearing member 48. The legs of lever 60 are notched at 62 to embrace a pin 63 fixed in the side walls 20 and 21 of the bracket 16.

A removable jack handle shown by dot-dash lines 64, is provided having spaced jaws 65 which may be fitted over a cross-piece 66 of the lever 60 to enable manual rocking of the lever 60 with increased leverage between its full-line and dot-dash line positions shown in FIG. 2 whereby a raise the bracket 16 along the post 34.

At the start of a counterclockwise rocking movement of the lever 60, the latter swings about to the pin 63, thus lowering the bearing member 48 slightly to wedge the conical bore section 50 against the balls 51 and thus lock the bearing member from further downward movement. Further counterclockwise rocking movement of the lever 60 causes the same to pivot about the trunnion pins 61 to produce an upward force against the pin 63 to incrementally raise the bracket 16 and thus the adjoining portion of the vehicle body.

Means may be provided to control the rate of movement of the bracket 16 downwardly relative to the post 34 when lowering the vehicle body from an elevated position, as will be described subsequently. For this purpose, a dash pot device generally indicated at 69 is provided comprising a cylinder 70 is screw threaded at 71 to the upper end of the bearing member 22. A cap 72 is screw threaded at 73 to the upper end of the cylinder 70. A cup shaped piston 74 of leather or elastomeric material is secured between two annular disc 75 and 76 at the upper end of the post 34 by a cap screw 77. The piston 74 forms a one-way sliding seal within the cylinder 70 when moving upwardly relative to the cylinder to compress air in the cylinder. A small hole 78 is formed in the cap 72 to control the rate of escape of the compressed air and thus control the speed at which the adjoining portion of the vehicle body may be lowered from an elevated position.

In operation, when the vehicle is in running or non-parking condition, the stabilizer is set in its condition shown in FIG. 2 with the control member 42 set as shown to engage the clutch 35 and to disengage clutch 36. Accordingly, the clutch 35 will lock the post 34 in its upper retracted position shown in full lines in FIG. 1 where the lower end thereof is located well above the supporting ground surface G.

When the vehicle is parked and is to be stabilized, the handle 44 of each stabilizer unit, i.e. 14, is turned upward into its dot-dash line position 44a of FIG. 5, releasing clutch 35 and engaging clutch 36, thereby permitting the post 34 to fall under the action of gravity until a pad 80 on the bottom thereof engages the ground surface G, thereby stabilizing the vehicle body against rocking.

By forcibly rocking the vehicle body when the stabilizer units are in stabilized condition, each bracket 16 may inch its way upwardly somewhat along the associated post 34. This is particularly applicable in the case of lightweight vehicle bodies. However, in the case of heavy vehicle bodies or if it is desired to raise the body to a substantial height as may be required to level the same when the vehicle is parked on uneven ground, the jack handle 64 is coupled to the level 60 of an appropriate stabilizer unit and is actuated to rock the lever between its full and dotted line positions of FIG. 2, causing the bracket 16 to move upwardly one increment at a time. During the upward movement of the lever 60, the bracket 16 will be held in its previously held position by the clutch 36.

When the vehicle is to be driven from its parked position, the handle 44 of each of the stabilizer units is again turned downwardly, releasing each clutch 36 and engaging clutch 35, thereby allowing the vehicle body to be lowered at a controlled rate as determined by the ejection of air through the hole 78 until the body is fully supported by its spring suspension system. At this time, each post 34 may be freely moved upwardly by hand until it reaches its upper position shown in full lines in FIG. 1 where it will be locked against dropping by the associated clutch 35.

When used to stabilize lightweight vehicle bodies only, as mentioned heretofore, the clutch 46 and its actuating lever 60 may be omitted. Also, the dash pot device 69 for controlling the rate of lowering of the vehicle body could be omitted.

DESCRIPTION OF THE MODIFIED EMBODIMENT

FIGS. 6 and 7 illustrate a modified form of the invention to be used in lieu of or in conjunction with the dash pot 69 shown in FIG. 2. In these FIGS. 6 and 7, those elements which are common to the embodiment shown in FIGS. 1 to 5 are noted by the same reference numerals.

An adjustable friction brake generally indicated at 79 is provided comprising a multi-stranded flexible cable 81 of steel or the like which is anchored at one end to an anchor stud 82 suitably secured to the underside of the shelf 18. For this purpose, the cable 81 passes through a transverse hole in the stud 82 and is clamped therein by a nut 83 screw threaded on the stud. The cable is wrapped around the post 34 and it's opposite end is suitably anchored in an adjusting member 84 which is screw threaded in the shelf 18. Member 84 has a slotted arm 85 extending integrally therefrom to receive an adjusting thumb screw 86 which is screw threaded into a post 87 which is pivotally mounted in a bearing formed in the shelf 18.

The thumb screw 86 is adjusted to rock the member 84 and thus control the tension of the cable 81 about the post 34 to vary the amount of frictional engagement therewith.

From the foregoing, it will be observed that numerous variations and modifications may be effected without departing from the true spirit and scope of the novel concept of the invention. It is, of course, intended to cover by the appended claims, all such modifications as fall within the scope of the claims.

I claim:
1. An adjustable support comprising
a support post,
a device movable along said post,
a first one-way clutch for preventing relative movement between said post and said device in one direction and permitting relative movement in the opposite direction,
a second one-way clutch for preventing relative movement between said post and said device in said opposite direction and permitting relative movement in said one direction,
selectively settable means for releasing one or the other of said clutches,
a slider movable lengthwise of said post,
a third one-way clutch for preventing relative movement between said post and said slider in said opposite direction and permitting relative movement in said one direction,
an adjusting lever,
first pivot means pivotally connecting said lever to said slider,
second pivot means pivotally connecting said lever to said device, and
means for oscillating said lever whereby to advance said device along said post upon movement of said lever in one direction about said first pivot means and to advance said slider along said post upon movement of said lever in an opposite direction about said second pivot means.

2. An adjustable support as defined in claim 1 comprising
means normally releasing said third clutch, and
means responsive to oscillation of said lever for rendering said releasing means ineffective.

3. An adjustable support as defined in claim 2 wherein said releasing means comprises spring means normally maintaining said lever in a preselected position.

4. An adjustable stabilizer for supporting a vehicle body against rocking when in parked condition comprising
a support post,
a bracket device for attachment to said body,
said bracket device being movable along said post,
said bracket device forming a first conical bore section surrounding said post and a second conical bore section surrounding said post,
said second bore section tapering oppositely from said first conical bore section,
a first one-way clutch comprising a first set of balls between said post and said first conical bore section for preventing relative movement between said post and said bracket device in one direction;
a second one-way clutch comprising a second set of balls between said post and said second conical bore section for preventing relative movement between said post and said bracket device in an opposite direction, and
control means for selectively disengaging said first set of balls from said first conical bore section or disengaging said second set of balls from said second conical bore section.

5. An adjustable stabilizer as defined in claim 4 wherein said control means comprises a control member movable to a first position to disengage said first set of balls from said first conical bore section and movable to a second position to disengage said second set of balls from said second conical bore section.

6. An adjustable stabilizer as defined in claim 4 comprising
a first ball cage for retaining said first set of balls,
spring means urging said first cage to engage said first set of balls between said post and said first conical bore section,
a second ball cage for retaining said second set of balls, spring means urging said second cage to engage said second set of balls between said post and said second conical bore section, said control means comprising a control member movable to a first position to move said first cage to disengage said first set of balls from said first conical bore section and movable to a second position to move said second cage to disengage said second set of balls from said second conical bore section.

7. An adjustable stabilizer as defined in claim 4 comprising a slider movable lengthwise of said post, said slider having a third conical bore section surrounding said post, a third one-way clutch comprising a third set of balls between said post and said third conical bore section for preventing relative movement between said post and said bracket device in said one direction, an actuating lever, first pivot means pivotally connecting said lever to said slider, second pivot means pivotally connecting said lever to said bracket device, means controlled by said lever when in a predetermined position to release said first set of balls from engagement with said third conical bore section, and means for oscillating said lever from said predetermined position whereby to engage said third set of balls with said third conical bore section to fulcrum said lever about said first pivot means during movement of said lever in one direction, said lever being effective during movement in the opposite direction to fulcrum about said second pivot means to move said slider along the length of said post.

8. An adjustable stabilizer as defined in claim 7 comprising spring means for yieldably maintaining said lever in said predetermined position.

9. An adjustable stabilizer as defined in claim 7 comprising a flexible cable wrapped around said post and means for tensioning said cable different amounts whereby to control the movement of said bracket device relative to said post.

* * * * *